(12) United States Patent
Gong et al.

(10) Patent No.: US 7,388,895 B2
(45) Date of Patent: Jun. 17, 2008

(54) CORNER-PUMPING METHOD AND GAIN MODULE FOR HIGH POWER SLAB LASER

(75) Inventors: Mali Gong, Beijing (CN); Chen Li, Beijing (CN); Qiang Liu, Beijing (CN); Ping Yan, Beijing (CN); Gang Chen, Beijing (CN); HaiTao Zhang, Beijing (CN); Ruizhen Cui, Beijing (CN)

(73) Assignee: Tsinghua University, Beijing (CN)

( * ) Notice: Subject to any disclaimer, the term of this patent is extended or adjusted under 35 U.S.C. 154(b) by 259 days.

(21) Appl. No.: 10/719,072

(22) Filed: Nov. 21, 2003

(65) Prior Publication Data

US 2005/0111510 A1    May 26, 2005

(51) Int. Cl.
H01S 3/06    (2006.01)
H01S 3/093    (2006.01)

(52) U.S. Cl. .......................... 372/66; 372/72
(58) Field of Classification Search ................ 372/69, 372/92, 66, 72
See application file for complete search history.

(56) References Cited

U.S. PATENT DOCUMENTS

| | | | |
|---|---|---|---|
| 4,127,827 A | 11/1978 | Barry | |
| 4,730,324 A | 3/1988 | Azad | |
| 4,852,109 A | 7/1989 | Kuchar | |
| 5,271,031 A | 12/1993 | Baer | |
| 5,305,345 A | 4/1994 | Albrecht et al. | |
| 5,441,803 A | 8/1995 | Meissner | |
| 5,619,522 A * | 4/1997 | Dube | 372/72 |
| 5,646,773 A | 7/1997 | Injeyan et al. | |
| 5,651,021 A | 7/1997 | Richard et al. | |
| 5,974,061 A * | 10/1999 | Byren et al. | 372/34 |

(Continued)

FOREIGN PATENT DOCUMENTS

CN    1398028 A    2/2003

*Primary Examiner*—Minsun Harvey
*Assistant Examiner*—Marcia A. Golub
(74) *Attorney, Agent, or Firm*—Thelen Reid Brown Raysman & Steiner

(57) ABSTRACT

Corner pumping method and gain module for high power slab laser are disclosed. In one embodiment, said method comprises directing a pump light from one or more pump light sources each consisting of a high power diode array and its coupling system into a laser slab through prior cut slab corners of said laser slab without restriction to the incident angle or the polarization state of the pump light, wherein said laser slab includes an undoped circumambient portion and one or more doped central portions; propagating said pump light within the laser slab by total internal reflection (TIR), wherein said pump light firstly pass said undoped circumambient portion, secondly pass said doped central portion, thirdly pass said undoped circumambient portion again, and fourthly take inner reflection at the surface of said undoped circumambient portion, and by repeating these steps, achieve multi-pass absorption; and substantially absorbing the pump light during propagating. In another embodiment, said gain module comprises a laser slab formed by solid state laser material, said laser slab including an undoped circumambient portion and one or more doped central portions and prior cut slab corners with corner faces; and one or more pump source providing a pump light; wherein said pump light is directed into said laser slab through said slab corners of said laser slab, propagated within said laser slab and substantially absorbed during propagation; and wherein said laser slab outputs an amplified laser beam.

12 Claims, 4 Drawing Sheets

U.S. PATENT DOCUMENTS

| | | |
|---|---|---|
| 6,094,297 A | 7/2000 | Injeyan et al. |
| 6,134,258 A | 10/2000 | Tulloch et al. |
| 6,865,213 B2 * | 3/2005 | Perry et al. .................. 372/72 |
| 6,873,639 B2 * | 3/2005 | Zhang .......................... 372/69 |
| 2002/0054282 A1 * | 5/2002 | Sasaya et al. ................. 355/53 |
| 2002/0105997 A1 * | 8/2002 | Zhang .......................... 372/70 |

* cited by examiner

CORNER-PUMPING METHOD AND GAIN MODULE FOR HIGH POWER SLAB LASER

FIELD OF THE INVENTION

The present invention relates generally to pumping method and gain module for solid-state slab laser. More particularly, the present invention relates to pumping method and gain module which includes an extended slab of a solid-state laser material such as a rare earth doped yttrium-aluminum-garnet (YAG) crystal and can be used in either a laser or an optical amplifier.

BACKGROUND OF THE INVENTION

Gain medium with rod or slab geometries are commonly used for high power solid-state laser. In general, slab geometry has advantages over rod geometry. For example, material for the slab is selected to have a relatively high index of refraction. The slab is cooled with a cooling medium having a relatively low index of refraction. This change in the index of refraction at the slab coolant interface results in incident light beams directed to one end face of the slab being totally internally reflected through the slab in a zigzag manner. The zigzag optical path averages the primary thermal gradient in the thickness direction, and reduces thermal lensing effect. In addition, the rectilinear cross section of the slab makes stress-induced birefringence much lower. Examples of solid-state lasers utilizing such zigzag amplifiers are disclosed in U.S. Pat. Nos. 4,730,324, 4,852,109, 5,305,345, 6,094,297 and 6,134,258.

In order to excite the laser slab to a relatively high-energy meta-stable state, various pumping methods have been developed for slab lasers, such as side pumping, end pumping, and edge pumping. For side-pumping geometry, the pumping sources are configured such that the light from the pumping source is directed along a lateral face of the slab in a direction generally perpendicular to the longitudinal axis of the slab, to obtain uniform pump power distribution in the slab. Examples of optical amplifiers with such configuration are disclosed in U.S. Pat. Nos. 4,127,827, 4,852,109, 5,271,031, 5,305,345, 5,646,773 and 5,651,021. Unfortunately, such configurations limit the absorption length of the pumping light to just a few millimeters. When such side pump configurations are used with lasers or optical amplifiers which use a solid-state laser material with relatively low absorption coefficient, such as Yb doped materials, it causes low absorption efficiency, and thus the overall efficiency are reduced. As disclosed in U.S. Pat. No. 6,094,297, a novel end-pumped zigzag slab laser which has relatively long absorption length is invented, but the disadvantage of this invention is that, with such configuration, power scaling is difficult because one can not couple more pump power into the slab while maintaining the slab thickness not too large for the reason of effective cooling. As disclosed in U.S. Pat. No. 6,134,258, a transverse-pumped configuration is invented in order to increase absorption length by using width of the slab instead of thickness to absorb pump light. Unfortunately, for high power laser using quasi-three-level lasing material, such as Yb doped materials, the doping concentration must be low in order to decrease laser threshold, therefore, absorption is not sufficient while utilizing such transverse-pumped configuration due to relatively low absorption coefficient.

SUMMARY OF THE INVENTION

A corner-pumping method for slab laser and a solid-state laser gain module are disclosed. In one embodiment, said method comprises directing a pump light into a laser slab through slab corners of said laser slab; propagating the pump light within the laser slab by total internal reflection (TIR); and substantially absorbing the pump light during propagating. In another embodiment, said gain module comprises a laser slab formed by a solid state laser material, said laser slab including slab corners with corner faces; and a pump source providing a pump light; wherein said pump light is directed into said laser slab through said slab corners of said laser slab, propagated within said laser slab by total internal reflection (TIR), and substantially absorbed during propagation; and wherein said laser slab outputs an amplified laser beam.

Other features and advantages of the present invention will be apparent from the accompanying drawings and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION OF THE DRAWINGS

A corner-pumping method for slab laser and a solid-state laser gain module are disclosed. A pump light is directed into a laser slab through slab corners of said laser slab. The pump light is propagated within the laser slab by total internal reflection (TIR). The pump light is substantially absorbed during propagation. The laser slab outputs an amplified laser beam. Following is the detail for further illustration.

Figure 1:
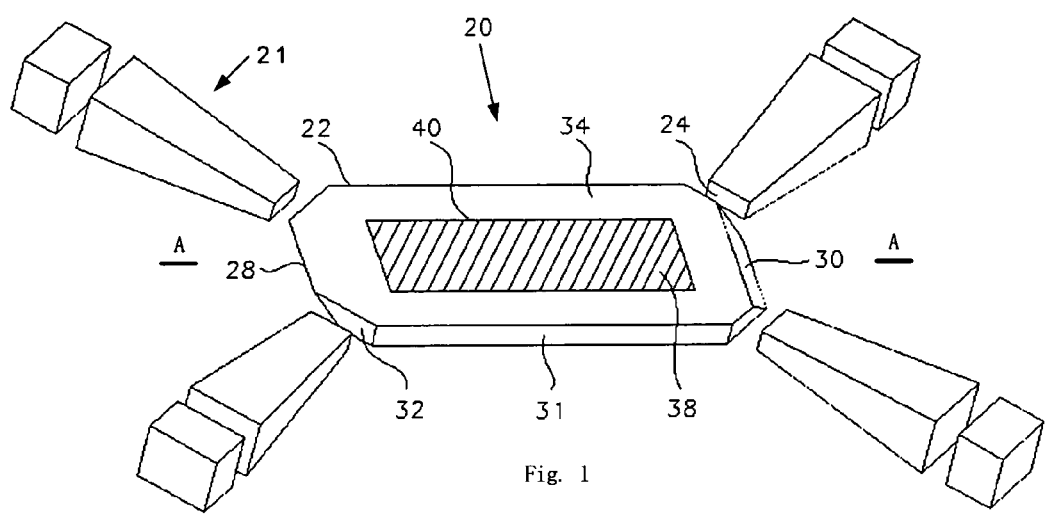
FIG. 1 is a structure view of a gain module according to one embodiment of the invention.

FIG. 1 is a structure view of a gain module according to one embodiment of the invention. A gain module 20 includes a slab 22 and four pumped beam sources 21. Generally, the slab 22 is formed with a rectangular or square cross section which defines a pair of opposing end faces 28 and 30, four lateral faces 31 and four corner faces 32. Typically the number of corner faces is four, but maybe there are eight or more corner faces.

Figure 2A:
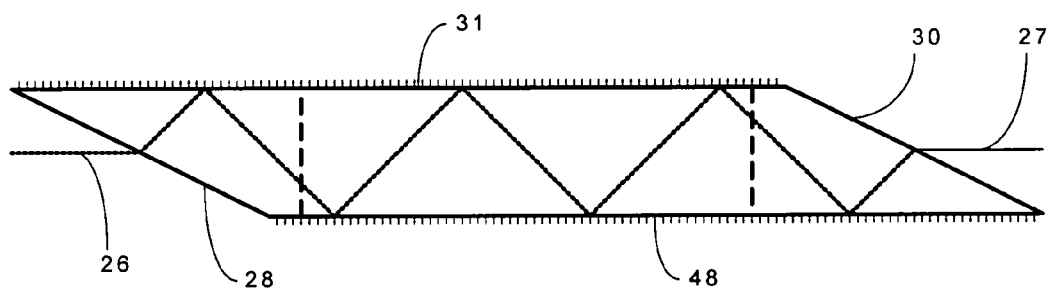
FIGS. 2a, 2b and 2c are A-A cross section views of FIG. 1 showing alternative shapes for the laser slab and alternative optical paths for the laser beam according to another embodiment of the invention.

Typically the slab 22 is formed from a solid-state laser material with a relatively high index of refraction. Referring to FIG. 2a, because of internal reflection, an input beam 26 travels in a zigzag pattern, forming a so-called zigzag amplifier. Such zigzag amplifiers are known to allow the input beam to average thermal gradients in the slab effectively. Zigzag optical path, homogeneous four corners pumping, and thermal insulation at the slab edges can reduce thermal lensing effect as well as stress induced birefringence.

Figure 2B:
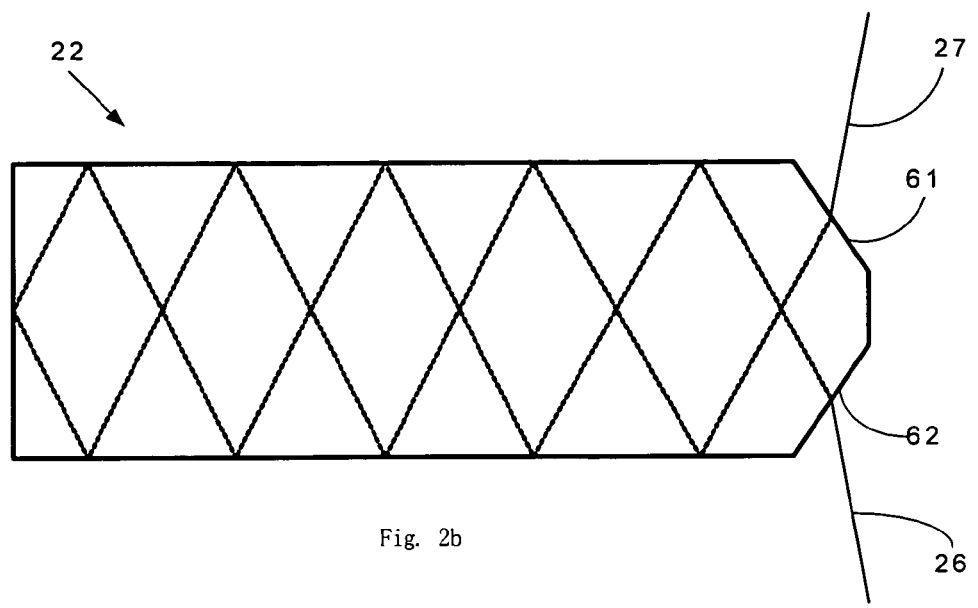
Figure 2C:
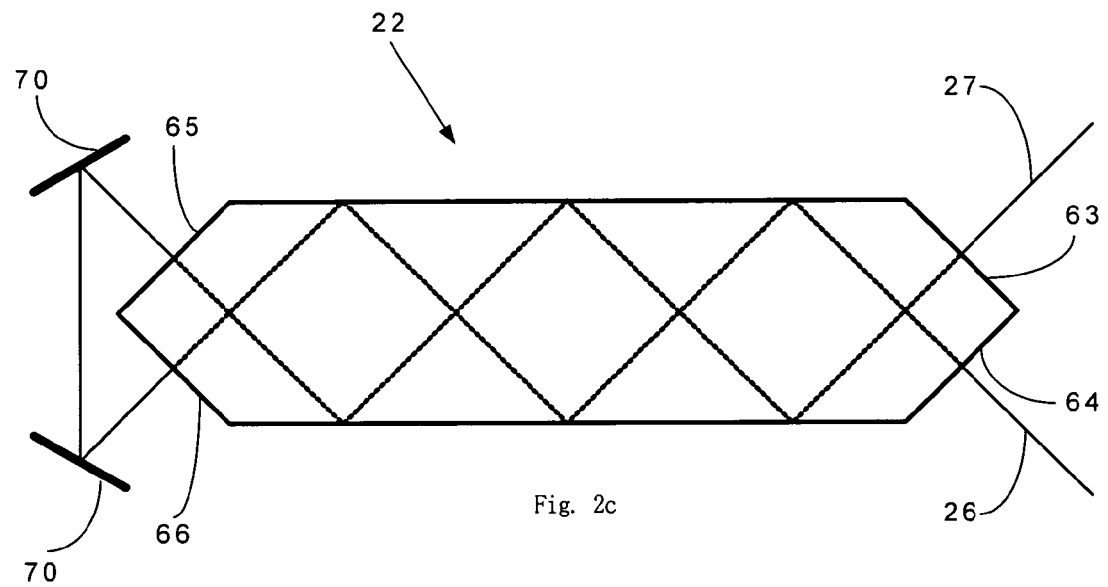

There are many alternative forms for the zigzag optical path. FIGS. 2a, 2b and 2c are A-A cross section views of FIG. 1 showing alternative shapes for the laser slab and alternative optical paths for the laser beam according to another embodiment of the invention. Referring to FIG. 2a, the input face 26 and an output face 27 are located at the opposite ends of the slab 22. Referring to FIG. 2b, an input face 61 and an output face 62 are at the same side of the slab 22. Referring to FIG. 2c, slab 22 has four end faces 63, 64, 65, 66. The input face 63 and the output face 64 are at the same side of the slab 22. Two additional mirrors 70 are used in this arrangement, and are placed in the input optical path of the face 65 and the output optical path of the face 66. FIG. 2a, 2b, 2c are intended to give an idea of the variety of shapes possible for slab 22, but not to be limited to the disclosed embodiments here.

In order to get higher pump power density and better pump uniformity, and reduce heating of the circumambient portions of the slab 22, the slab 22 is formed by a diffusion bonded composite material (see FIG. 1). More particularly, around the slab 22, a circumambient portion 34 of the slab 22 can be formed by un-doped host material such as yttrium-aluminum-garnet (YAG). The circumambient portion 34 can be diffusion bonded to a central portion 38 of the slab 22 which is formed by a doped host material such as Yb doped YAG (Yb:YAG), thus forming four diffusion bonding interfaces 40. Such diffusion bonding techniques are known in the art, for example, as described in detail in U.S. Pat. No. 5,441,803 hereby incorporated by reference. Such a configuration limits the pump power absorption to the center portion 38 of the slab 22. By limiting the pump power absorption to the center portion 38 of the slab 22, heat generated by the optical pumping is in the center portion 38 and away from the circumambient portion 34. In order to enable the pump light into the slab 22, the four corner faces 32 may be formed by coating, such as an antireflection coating selected for the wavelength of the pump beams 24. As shown in FIG. 1, the antireflection coating selected for the wavelength of the laser beam 26 is disposed on the opposing end faces 28 and 30, and thereby reducing loss of the input laser beam. Furthermore, four lateral faces 31 are high-reflection coated selected for the wavelength of the pump beams 24 to ensure pump light not to escape. The four pump beams 24 are directed to four corner faces 32 of the slab 22 and are totally reflected inside the slab 22 to achieve sufficient absorption. By utilizing the composite slab 22 as discussed above, the pump power absorption of the slab 22 is limited to the central portion 38 and therefore results in relative high pump power density and good pump uniformity, which is particularly profitable for quasi-three-level laser material, such as Yb doped materials.

Figure 3:
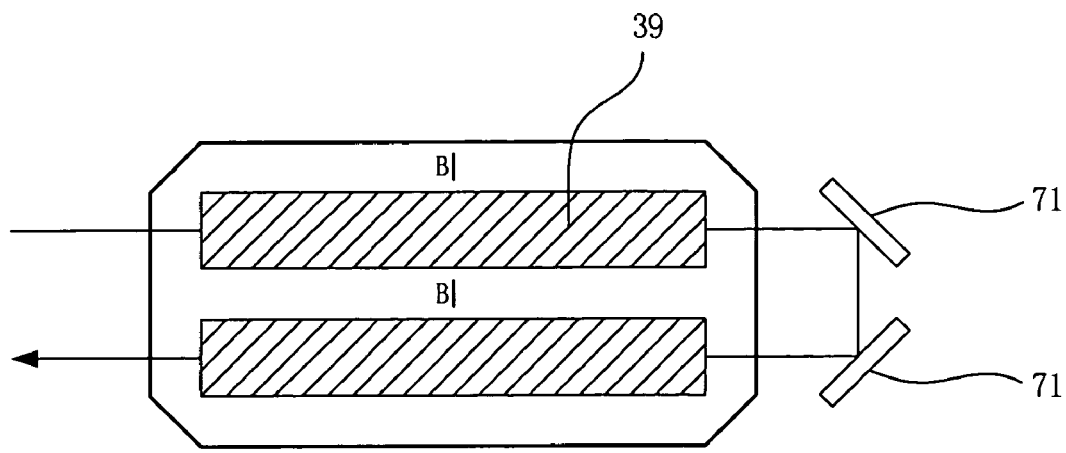
FIG. 3 is a structure section view illustrating a slab with two center-doped portions according to another embodiment of the invention.

FIG. 3 is a structure section view illustrating a slab with two center-doped portions according to another embodiment of the invention. Referring to FIG. 3, the central portion 38 includes two doped host materials 39. Therefore, the optical path is folded by additional mirrors 71. The number of doped portions may be three or more.

Figure 4A:
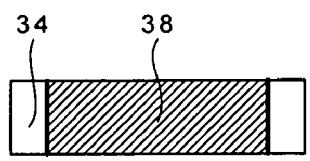
FIGS. 4a, 4b and 4c are B-B cross section views of FIG. 3 describing alternative shapes of the doped host material according to another embodiment of the invention.
Figure 4B:
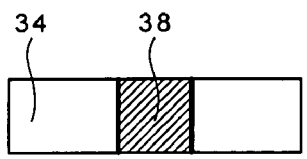
Figure 4C:
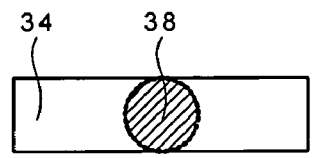

There are many alternative shapes for the doped host material 39, and FIGS. 4a, 4b and 4c are B-B cross section views of FIG. 3 describing alternative shapes of the doped host material according to another embodiment of the invention. Particularly, FIGS. 4a, 4b, and 4c show that the cross-section of the doped host material 39 can be rectangular, square or circular, respectively. FIGS. 4a, 4b, 4c are intended to give an idea of the variety of shapes possible for doped host material 39, but not to be limited to the disclosed embodiments here.

Figure 5:
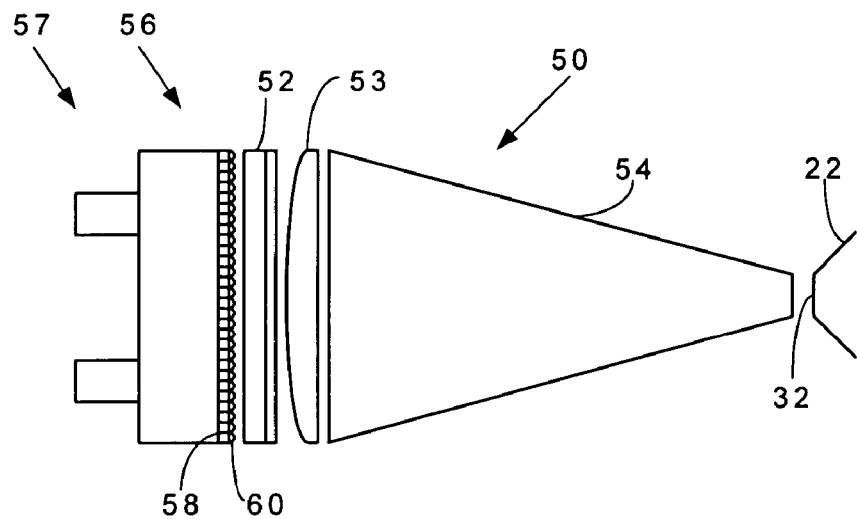
FIG. 5 is a structure section view of a lens duct assembly and a diode array according to one embodiment of the invention.

The pump source 21 consists of high power diode array and its coupling system. Referring to FIG. 5, a high power diode array 56 with a diode array cooler 57, may be used to generate the pump beams. The coupling system is aimed to couple the pump light from high power diode array to the pump face efficiently. A coupling system 50 includes two cylindrical lenses 52, 53 and a lens duct 54, said lens duct 54 is placed between the diode array 56 and a corner face 32 on the slab 22. The generatrices of the two cylindrical lenses 52 are orthogonal to each other, and parallel to diode array's fast axis and slow axis respectively. The diode arrays 56 may include a plurality of stacked diode bars 58, each of them with an individual micro-lens 60. The micro-lens 60 can reduce the divergence of the fast axis of the bars 58 to be approximately 1°, while the slow axis may have a full angle divergence on the order of 10° By using the lens duct assembly 50, the output of the diode array 56 can be efficiently imaged onto the corner faces of the slab 22 with a large compress ratio, such that a 2.4×2.0 cm diode array may be imaged onto an area as small as 3×1 mm.

Figure 6:
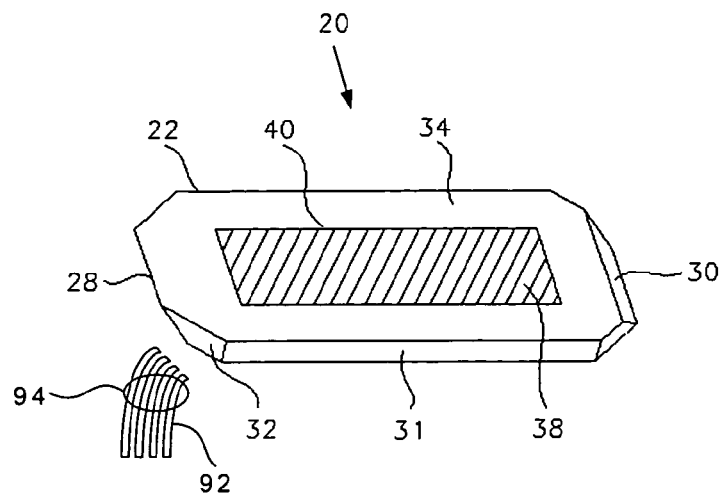
FIG. 6 is a structure view of a corner pumped architecture with fiber coupled pump light according to another embodiment of the invention.

FIG. 6 is a structure view of a corner pumped architecture with fiber coupled pump light according to another embodiment of the invention. Referring to FIG. 6, the pump light is coupled to the slab 22 by a fiber bundle 94 formed by one or more optical fibers 92. Only one of four fiber bundles is shown in FIG. 6 for brevity.

Figure 7:
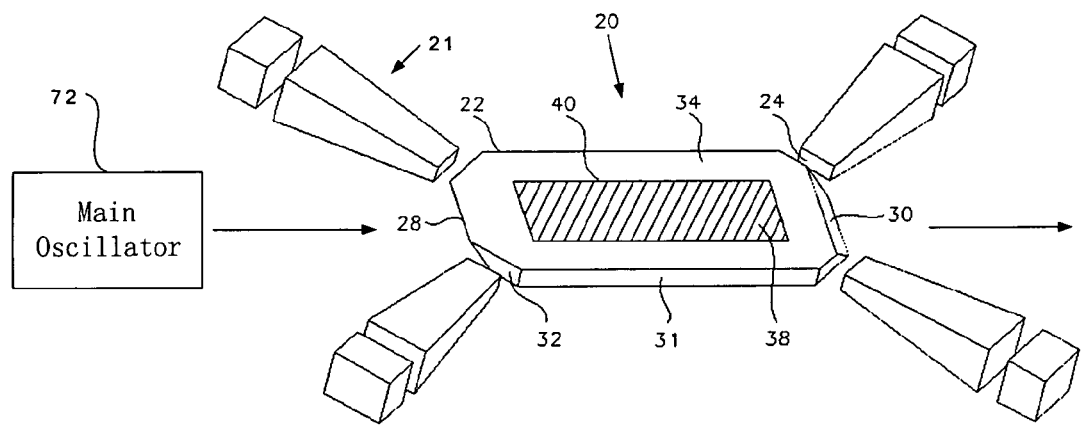
FIG. 7 is a structure view of the corner pumped gain module in a master oscillator power amplifier (MOPA) configuration according to another embodiment of the invention.

The gain module 20 in accordance with the present invention may be used to form a master oscillator power amplifier (MOPA). FIG. 7 is a structure view of the corner pumped gain module in a master oscillator power amplifier (MOPA) configuration according to another embodiment of the invention. Referring to FIG. 7, a master oscillator 72 is directed to an input end face 28 of the slab 22. The master oscillator is specifically illustrated in FIG. 8.

Figure 8:
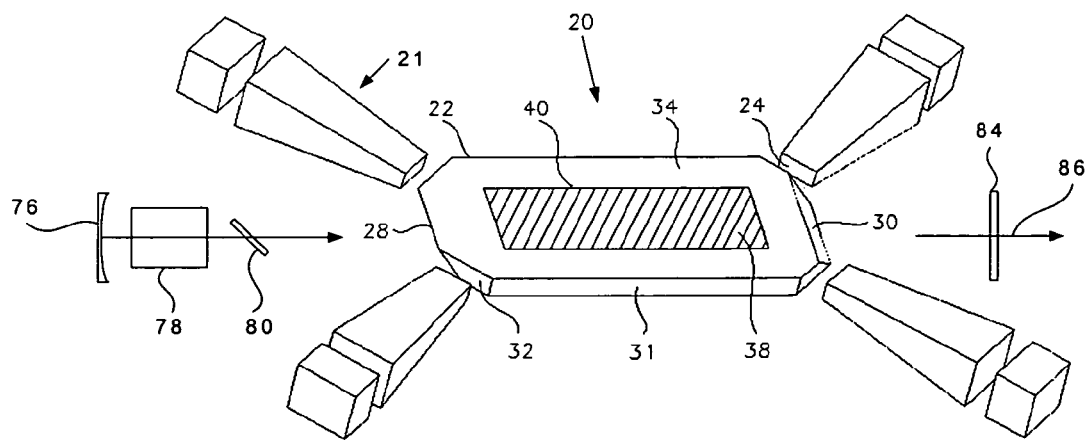
FIG. 8 is a structure view of the corner pumped gain module in a resonator configuration according to another embodiment of the invention.

FIG. 8 is a structure view of the corner pumped gain module in a resonator configuration according to another embodiment of the invention.

Referring to FIG. 8, cavity mirrors 76 and 84 are high reflective and partial reflective cavity mirrors respectively. The gain module 20 further includes a Q-switch 78, a polarizer 80, and an output laser beam 86 can travel within the gain module 20.

It is known in the art that pumping of the slab 22 results in increased temperature in the area where the pump light is absorbed. In order to cool the slab 22, various cooling methods can be used. Both conduction and convection cooling systems are suitable.

To minimize the thermal resistance between the slab 22 and the coolers, a thin layer of a thermally conductive material such as a soft metal (e.g., indium or gold), may be used. During assembly process, the cooler/indium/slab assembly may be held under pressure at elevated temperatures, approximately 150° C., to flow the indium and eliminate contact resistance.

In the case of convection and conduction cooling, the upper and lower faces of the slab 22 are coated with a dielectric material which serves as an evanescent wave coating 48 to preserve total internal reflection, as shown in FIG. 2a. The evanescent wave coating 48 allows the slab 22 to be directly adhered to the impingement cooler. A thick layer (2-4 μm) of $MgF_2$ or $SiO_2$ may be used to form the evanescent wave coating 48.

The present invention has the following advantages comparing to prior arts. Because the pump light is directed into the corner faces of the laser slab and mostly confined by TIR, multiple absorptions result in high absorption efficiency, thus enhance the overall laser amplification efficiency. In addition, since the laser slab includes a circumambient portion having an un-doped host area and a central portion having one or more doped host areas, the pump power is ensured to be absorbed in the center portion of the slab. Such a laser gain module provides relatively low residual thermal lensing effect, prevents birefringence effect, reduces circumambient temperature and avoids distortion of the slab.

Furthermore, such laser gain module can reach higher pump intensity and better pump uniformity for quasi-three level lasing material, such as Yb doped materials.

Thus, pumping method and gain module for solid-state laser has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A corner-pumping method for high power slab laser comprising:

directing a pump light from one or more pump light sources each consisting of a high power diode array and its coupling system into a laser slab through prior cut-off slab corners of said laser slab without restriction to the incident angle or the polarization state of the pump light, wherein said laser slab is a convex polyhedron having one or more cut-off corners, which is formed by cutting one or more edges and vertexes of a rectangular parallelepiped, and includes an undoped circumambient portion and one or more doped central portions, wherein said undoped circumambient portion and said one or more doped central portions are diffusion bonded without gaps between them, said undoped circumambient portion has said corner faces and a plurality of lateral surfaces used as inner reflective surfaces, and all the plurality of lateral surfaces are planar;

propagating said pump light within said laser slab, wherein said pump light firstly pass said undoped circumambient portion, secondly pass said doped central portion, thirdly pass said undoped circumambient portion again, and fourthly take inner reflection at the plurality of lateral surfaces of said undoped circumambient portion, and by repeating these steps, achieve multi-pass absorption; and substantially absorbing the pump light by the said doped central portion during propagating.

2. The method as recited in claim 1, wherein cut-off corners of said undoped circumambient portion are coated for high transmission for the wavelength of the pump light, and the plurality of lateral surfaces of said undoped circumambient portion are coated for high reflection for the wavelength of the pump light.

3. The method as recited in claim 1, wherein a laser light propagates inside the laser slab in a zigzag optical path.

4. The method as recited in claim 1, wherein the step of absorbing achieves a high absorption efficiency through multi-pass absorption of pump light inside said laser slab.

5. A corner-pumped laser gain module for high power slab laser comprising:

a laser slab being a convex polyhedron having one or more cut-off corners, which is formed by cutting one or more edges and vertexes of a rectangular parallelepiped, and including an undoped circumambient portion and one or more doped central portions, wherein said undoped circumambient portion and said one or more doped central portions are diffusion bonded without gaps between them, said undoped circumambient portion having said cut-off corners and a plurality of lateral surfaces used as inner reflective surfaces, and all the plurality of lateral surfaces being planar; and one or more pump source providing a pump light, each pump source consisting of a high power diode array and its coupling system;

wherein said pump light from said one or more pump sources directly incident into said laser slab through prior cut-off slab corners of said undoped circumambient portion without restriction to the incident angle or the polarization state of the pump light, firstly pass said undoped circumambient portion, secondly pass said doped central portion, thirdly pass said undoped circumambient portion again, and fourthly take inner reflection at the plurality of lateral surfaces of said undoped circumambient portion, and by repeating these steps, achieve multi-pass absorption, and substantially absorbed by the said doped central portion during propagation; and wherein said laser slab outputs an amplified laser beam.

6. The laser gain module as recited in claim 5, wherein the number of said cut-off corners is four.

7. The laser gain module as recited in claim 5, wherein a cross section of said doped central portion is rectangular or square or circular.

8. The laser gain module as recited in claim 5, wherein said corner faces of said undoped circumambient portion are coated for high transmission for the wavelength of the pump light, and the plurality of lateral surfaces of said undoped circumambient portion are coated for high reflection for the wavelength of the pump light.

9. The laser gain module as recited in claim 5, wherein the input beam and the output beam are located at one same side of said laser slab, said input beam and said output beam forming an angle with each other.

10. The laser gain module as recited in claim 9, wherein two mirrors are placed at another side of the said laser slab symmetrically with respect of said input beam and said output beam.

11. The laser gain module as recited in claim 5, wherein said coupling system including two cylindrical lenses and a lens duct, said two cylindrical lenses being placed between the diode array and the lens duct, generatrices of said two cylindrical lenses are orthogonal to each other and are parallel to fast axis and slow axis of said diode array, respectively.

12. The laser gain module as recited in claim 5, wherein said coupling system being a fiber bundle.

* * * * *